United States Patent
Horikoshi et al.

(10) Patent No.: US 10,394,380 B2
(45) Date of Patent: Aug. 27, 2019

(54) METHOD AND APPARATUS FOR PREVENTING MALFUNCTIONS OF A TOUCH PANEL DISPOSED NEAR AN ANTENNA

(71) Applicant: LENOVO (SINGAPORE) PTE. LTD., Singapore (SG)

(72) Inventors: Hideto Horikoshi, Kanagawa-Ken (JP); Hidekazu Chujo, Tokyo (JP); Masahiro Kitamura, Tokyo (JP); Mitsuo Horiuchi, Kanagawa-Ken (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 32 days.

(21) Appl. No.: 15/631,719

(22) Filed: Jun. 23, 2017

(65) Prior Publication Data
US 2017/0371491 A1    Dec. 28, 2017

(30) Foreign Application Priority Data
Jun. 24, 2016 (JP) .................................. 2016-125031

(51) Int. Cl.
*G06F 3/041* (2006.01)
*G06F 3/0354* (2013.01)
*H04B 5/00* (2006.01)

(52) U.S. Cl.
CPC ........ *G06F 3/0418* (2013.01); *G06F 3/03547* (2013.01); *G06F 3/041* (2013.01); *H04B 5/0025* (2013.01)

(58) Field of Classification Search
CPC .... G06F 3/0418; G06F 3/03547; G06F 3/041; H04B 5/0025
See application file for complete search history.

(56) References Cited

U.S. PATENT DOCUMENTS

2014/0078094 A1  3/2014 Yang
2014/0253963 A1  9/2014 Aoyama
(Continued)

FOREIGN PATENT DOCUMENTS

JP  11-353432    12/1999
JP  2002-539517  11/2002
(Continued)

OTHER PUBLICATIONS

Lenovo (Singapore) Pte. Ltd., Application No. EP17176016, European Search Report dated Oct. 17, 2019.

*Primary Examiner* — Adam R. Giesy
(74) *Attorney, Agent, or Firm* — Antony P. Ng; Russell Ng PLLC (57) ABSTRACT

An apparatus for preventing malfunctions of a touchpad disposed near an antenna is provided. An NFC coil is disposed underneath a touchpad. In NFC, an NFC card approaches the surface of the touchpad. A touch controller sets the detection sensitivity of a finger to a reference value when an NFC module does not emit alternating magnetic fluxes. The touch controller reduces the detection sensitivity at the timing when the NFC coil starts the emission of the alternating magnetic fluxes. The touch controller returns the detection sensitivity to the reference value at the timing when the NFC coil stops the emission of the alternating magnetic fluxes. The NFC module directly transmits a signal with which the touch controller changes the detection sensitivity to the touch controller through a hardware line.

13 Claims, 6 Drawing Sheets

(56) References Cited

U.S. PATENT DOCUMENTS

2016/0026276 A1\* 1/2016 Lu ........................... G06F 3/046
                                                      345/173
2018/0004298 A1\* 1/2018 Liu ....................... H02J 7/025

FOREIGN PATENT DOCUMENTS

| JP | 2006-195925 | 7/2006 |
| JP | 2011-158936 | 8/2011 |
| JP | 2014-512603 | 10/2012 |
| JP | 2014-10707 A | 1/2014 |
| JP | 2014-170443 A | 9/2014 |
| JP | 2015-32113 A | 2/2015 |
| JP | 2016024746 A | 2/2016 |
| JP | 2016-82739 | 5/2016 |
| WO | 2012096259 | 7/2012 |
| WO | 2014189824 A1 | 11/2014 |

\* cited by examiner

METHOD AND APPARATUS FOR PREVENTING MALFUNCTIONS OF A TOUCH PANEL DISPOSED NEAR AN ANTENNA

PRIORITY CLAIM

The present application claims benefit of priority under 35 U.S.C. §§ 120, 365 to the previously filed Japanese Patent Application No. JP2016-125031 with a priority date of Jun. 24, 2016, which is incorporated by reference herein.

TECHNICAL FIELD

The present invention relates to touch panels in general, and in particular to a method and apparatus for preventing malfunctions of a touch panel disposed near an antenna.

BACKGROUND

In Near Field Communication (NFC) of a communication standard, the technical specification of which has been formulated by the NFC Forum as ISO/IEC14443 and ISO/IEC18092, communications can be performed in a state where NFC coils are brought close to each other so that the distance between the NFC coils is about 2 cm to about 4 cm or less.

For many laptop type portable computers, the location directly under a touchpad is suitable for the mounting of an NFC coil in physical aspects, such as a reduction of influence on a chassis and a measure against interference with other devices. However, when the NFC coil emits magnetic fluxes, the touchpad may experience problems due to noise. In order to prevent the above-mentioned problems, various measures of weakening the magnetic fluxes passing through the touchpad to lower the noise level have been taken. However, the magnetic fluxes emitted to space are also weakened by those measures, which causes problems to the NFC.

Consequently, it would be preferable to provide an improved method and apparatus for preventing malfunctions of a touch panel disposed near an antenna.

SUMMARY

In accordance with an embodiment of the present disclosure, an electronic device includes a touch panel, an electromagnetic coupling wireless module, a coil connected to the electromagnetic coupling wireless module, and a touch controller. The electromagnetic coupling wireless module conforms to the near field communication (NFC) standard. The touch controller detects coordinates of the touch panel with a predetermined detection sensitivity, and then reduces the detection sensitivity only when the coil is emitting magnetic fluxes.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

I. Electromagnetic Coupling Wireless Communication

In most wireless communication, the energy emitted by a transmitting antenna propagates through space in the form of electromagnetic waves, and then a receiving antenna absorbs the energy from the electromagnetic waves in the space. When an alternating voltage is applied to the transmitting antenna, a high frequency current flows, so that an electric field and a magnetic field (electromagnetic field) are generated around the antenna. The electromagnetic waves for use in the wireless communication are generated so that the electric field and the magnetic field are mutually chained to propagate a long distance. Data can be transmitted while modulating the electromagnetic waves serving as carrier waves with a baseband signal.

On the other hand, when an alternating current is caused to flow through the transmitting coil, an alternating magnetic field is generated in space close thereto. The alternating magnetic field generates alternating magnetic fluxes of a size according to the magnetic permeability of the space, and a voltage is induced due to electromagnetic induction in a receiving coil interlinked to the alternating magnetic fluxes. This phenomenon is referred to as electromagnetic induction or electromagnetic coupling and is usable for the wireless communication. When an alternating current flows through the transmitting coil, the transmitting coil also emits electromagnetic waves. However, a system of performing communication using the electromagnetic coupling of approaching coils is referred to as electromagnetic coupling wireless communication in distinction from a communication system using the electromagnetic waves.

The electromagnetic coupling wireless communication is employed in RFID, Felica®, and the like other than the NFC. The electromagnetic coupling wireless communication is also employed in wireless electric power transmission. In the electromagnetic coupling wireless communication, carrier waves serve as alternating magnetic fluxes and the communication distance falls in the range of a near magnetic field in which electromagnetic coupling can be achieved, and therefore the communication distance is short. In the electromagnetic coupling wireless communication, a large amount of alternating magnetic fluxes are generated near the transmitting coil. Therefore, when a wireless module is mounted in an electronic device, the wireless module is likely to be a noise source.

As the NFC, passive communication in which communication is performed with a non-contact IC card in which a reader/writer does not have a power supply and active communication in which two devices each having a power supply alternately serve as an initiator and a target to perform communication are defined. In the passive communication, a polling device operating as an initiator emits strong alternating magnetic fluxes in order to supply energy to a listening device serving as a target.

II. Laptop

Figure 1:
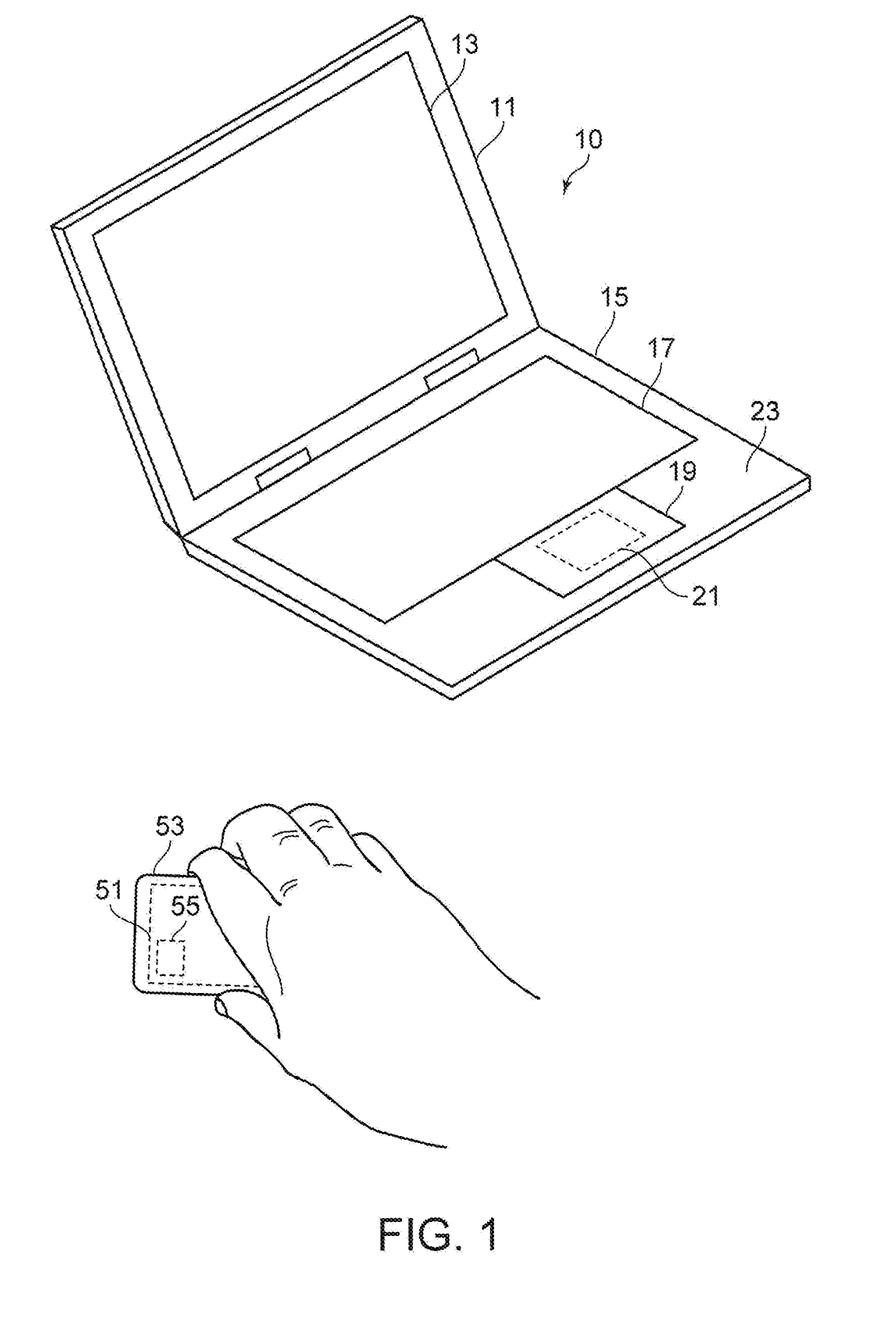
FIG. 1 is a perspective view of a laptop supporting NFC.

FIG. 1 is a perspective view for explaining the outline of the laptop 10 supporting the NFC. In the laptop 10, a display chassis 11 having a display 13 and a system chassis 15 having a keyboard 17 and a touchpad 19 on the surface and storing a circuit board mounting a system device therein are openably/closably coupled to each other. Under the touchpad 19, an NFC coil 21 is disposed.

The touchpad 19 operates a mouse cursor displayed by the display 13 using a touch panel which detects a finger contacting the same to specify indicating coordinates. As the touchpad 19, a projection type electrostatic capacity type can be used as an example and other detection principles, such as an electromagnetic induction type or a resistive film type, may be employed. In the touchpad 19, a set of electrodes for detecting the position of a finger is arranged in the X direction and in the Y direction. The operation surface of the touchpad 19 also serves an access surface of the NFC card 53. The NFC card 53 has an NFC coil 51 and an IC chip 55.

When the laptop 10 performs reading/writing on the NFC card 53, a user brings the NFC card 53 close to the touchpad 19 regarded as the operation surface. Around the touchpad 19 and the keyboard 17, a palm rest 23 containing a metal material is provided. In the NFC coil 21, a magnetic field is weakened when a metal is present between the NFC coil 21 and the NFC card 53. A portion directly under the touchpad 19 is suitable as the position of the NFC coil 21 in the laptop 10, in which the chassis conditions are restricted, in terms of the fact that a good magnetic path with the NFC card 53 can be built.

Figure 2:
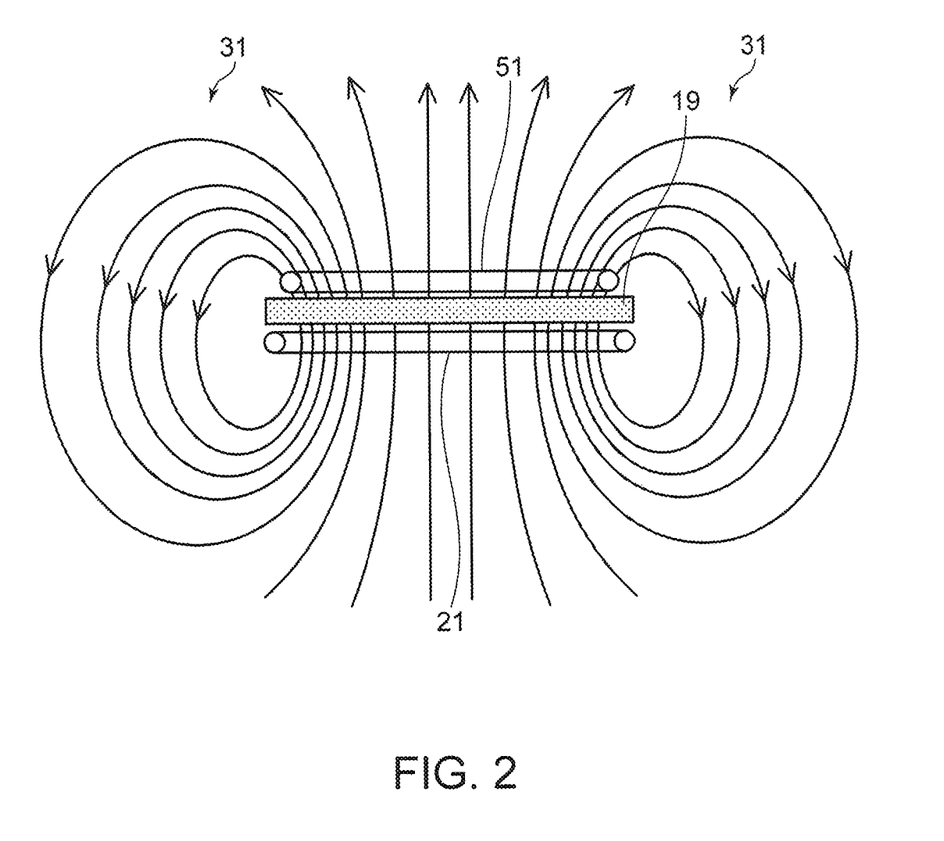
FIG. 2 is a view for explaining a state when an NFC coil of the laptop and an NFC coil of an NFC card are electromagnetically coupled to each other.

FIG. 2 explains the state when the NFC coil 21 mounted in the laptop 10 and the NFC coil 51 mounted in the NFC card 53 are electromagnetically coupled to each other. The NFC uses a 13.56 MHz frequency band. When a high frequency current of the use frequency band flows into the NFC coil 21, an alternating magnetic field is generated therearound, so that 13.56 MHz alternating magnetic fluxes 31 flow in the form of carrier waves from one side to the other side of the opening of the coil. When the NFC coil 51 approaches a position where the NFC coil 51 is interlinked to the alternating magnetic fluxes 31, an induction voltage is generated. The alternating magnetic fluxes 31 induce a voltage also in the metal present near the NFC coil 21, which causes a noise for each device. The alternating magnetic fluxes 31 flow while passing through the touchpad 19, and therefore a noise is generated also in the electrodes.

Figure 3A:
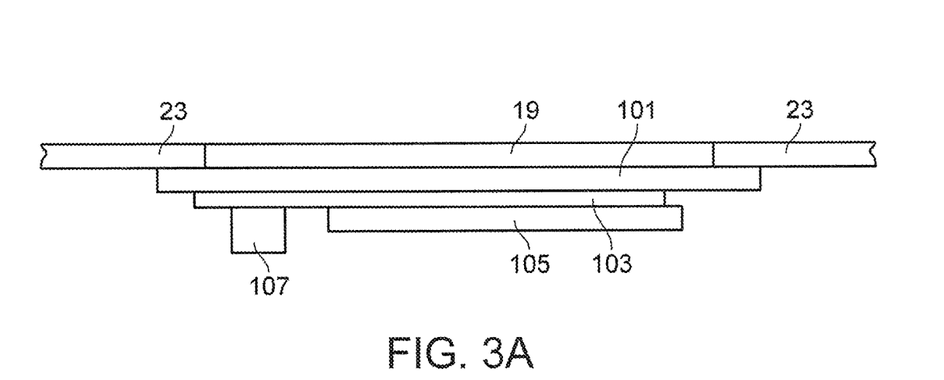
FIGS. 3A-3B are a cross-sectional view and a bottom view, respectively, showing the mounting position of the NFC coil.
Figure 3B:
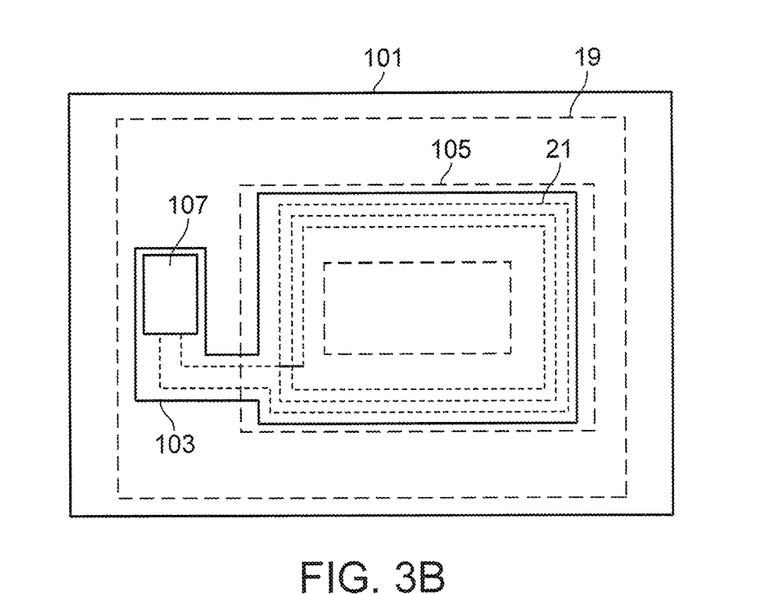

FIGS. 3A and 3B are a cross-sectional view and a bottom view, respectively, for explaining the mounting position of the NFC coil 21. FIG. 3A is a partial cross-sectional view containing the touchpad 19 and FIG. 3B is a bottom view illustrating a state where a ferrite sheet 105 is removed. On the bottom surface of the touchpad 19, a touch controller 205 (FIG. 4) which detects the coordinates of the operated touchpad 19 and a printed circuit board (PCB) 101 on which a circuit pattern is mounted are disposed. On the lower side the PCB 101, a flexible printed circuit board (FPC) 103 on which the pattern of the NFC coil 21 is formed is disposed. The NFC coil 21 is connected to an NFC module 203 (FIG. 4) with a connector 107 mounted on the PCB 101.

On the lower side of the FPC 103, the ferrite sheet 105 for strengthening magnetic fluxes emitted by the NFC coil 21 is disposed. The NFC coil 21 may be formed as a circuit pattern in the PCB 101. The NFC coil 21 is disposed directly under the touchpad 19 so that the outline is overlapped with the inner side of the projection of the outline of the touchpad 19 or the projection, and therefore the NFC coil 21 can emit magnetic fluxes required for the NFC to the outside from the surface of the touchpad 19.

Figure 4:
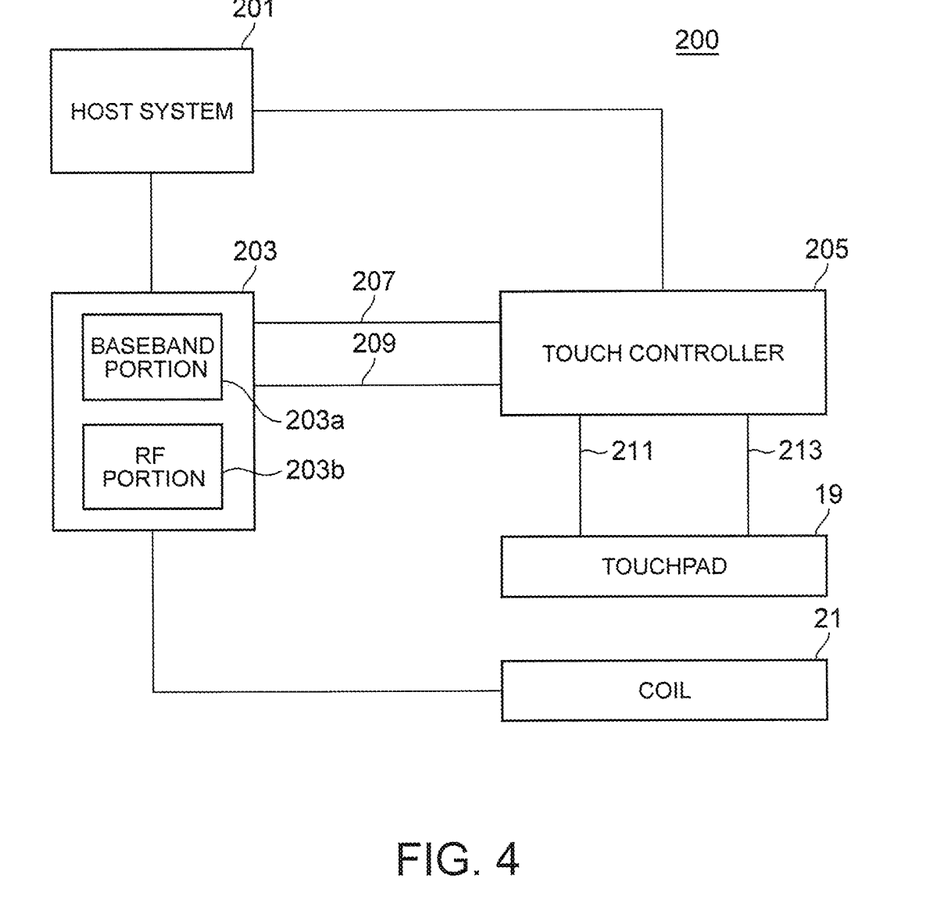
FIG. 4 is a functional block diagram of a malfunction prevention system.

FIG. 4 is a functional block diagram illustrating an example of the configuration of the malfunction prevention system 200. The malfunction prevention system 200 contains a host system 201, the electromagnetic coupling NFC module 203, the touch controller 205, the touchpad 19, and the NFC coil 21. The host system 201 contains hardware, such as a CPU, a system memory, a chip set, and a secondary memory, and software, such as a device driver, an OS, and an application program.

The host system 201 can operate based on the coordinates of the touch controller 205 as an input. The host system 201 can exchange digital data with the NFC module 203 to communicate with the NFC card 53. The NFC module 203 contains a baseband portion 203a and an RF portion 203b. The baseband portion 203a processes a baseband signal before modulation received from the host system and a baseband signal after demodulation received from the RF portion 203b. The RF portion modulates carrier waves with a baseband signal in transmission and demodulates subcarrier waves to a baseband signal in reception.

The NFC module 203 serves as an initiator to enable passive communication with the NFC card 53 having no built-in power supply. The NFC module 203 emits the alternating magnetic fluxes 31 from the NFC coil 21 only at specific timing when a power supply is turned on. The timing of the emission of the alternating magnetic fluxes 31 is described with reference to FIG. 6. The NFC module 203 directly outputs a transmission signal to the touch controller 205 through a hardware line 207 while emitting the alternating magnetic fluxes 31 from the NFC coil 21.

The transmission signal is used in order to change a threshold value at which the touch controller 205 detects a finger synchronously with the time when the NFC module 203 is emitting the alternating magnetic fluxes 31. Therefore, the transmission signal needs to be free from delay. Since the hardware line 207 can transmit a signal without the involvement of a device driver and a firmware executed by the CPU, the transmission signal can be transmitted without being affected by the operation of the CPU even in a pre-polling mode (see the explanation of FIG. 6) in which the cycle of emitting the alternating magnetic fluxes is short.

The NFC module 203 directly outputs a disable signal showing that the NFC module 203 enters a communication mode to the touch controller 205 through the same hardware line 209. The disable signal is used in order for the touch controller 205 to stop the detection of a finger or to stop the output of detected coordinates. The hardware line 209 can also be used with the hardware line 207. The usage of the transmission signal and the disable signal is described with reference to the flow chart of FIG. 5.

The touchpad 19 has the set of electrodes arranged in the X direction and in the Y direction in order to detect the approach of a finger. The parasitic capacitance of a human body is added to the electrodes which the finger approaches. The touchpad 19 detects the approach of a finger either as changes in the self-capacitance of the electrodes or changes in the mutual capacitance between adjacent electrodes. The touchpad 19 may support multi-touch in which the touch of a finger is detected simultaneously at multiple places.

The touch controller 205 is connected to the electrodes of the touchpad 19 by a drive circuit 211 and a sense circuit 213. In the present invention, the principle that the touch controller 205 detects the coordinates of a finger does not need to be particularly limited. The touch controller 205 can detect the approach of a finger from the size of the physical quantity of the sense circuit 213 responding to an alternating voltage or a pulse voltage applied to the touchpad 19 through the drive circuit 211.

Herein, the physical quantity (detected physical quantity) for use in the detection of a finger can be any one of the charge time, the voltage, the current, or those substituting the size of the parasitic capacitance, such as the size of the capacitance, of a capacitor. When a threshold value is set to the detected physical quantity and the detected physical quantity exceeds the threshold value, the touch controller 205 recognizes a finger and specifies the coordinates, for example. An induced voltage is induced in the electrodes of the touchpad 19 due to the alternating magnetic fluxes 31 emitted by the NFC coil 21. The induced voltage contains various frequency components and enters, as a noise, the touch controller 205 from the sense circuit 213.

The touch controller 205 recognizes the noise as the detected physical quantity. When the detected physical quantity generated by the noise exceeds the threshold value, the touch controller 205 recognizes the noise as a finger. The level of the detected physical quantity generated by the noise is smaller than the level of the detected physical quantity generated by the finger. Therefore, when the threshold value is increased, the probability of recognizing the noise as a finger decreases but the probability of recognizing a finger simultaneously also decreases. It takes time and effort to specify the level of the detected physical quantity of the noise and the level of the detected physical quantity which causes no troubles in the detection of a finger, and then set a threshold value therebetween because the conditions vary in each laptop.

The threshold value to the detected physical quantity is equivalent to a value determining whether the level (high or low) of the detection sensitivity of a finger is high or low. Depending on a system, the detection sensitivity decreases as the threshold value is lower but any case may be acceptable. The touch controller 205 changes the threshold value so as to reduce the detection sensitivity only when receiving a transmission signal through the hardware line 207. Due to the reduction in the detection sensitivity, the detection performance of a finger temporarily decreases but the noise resistance increases.

Figure 5:
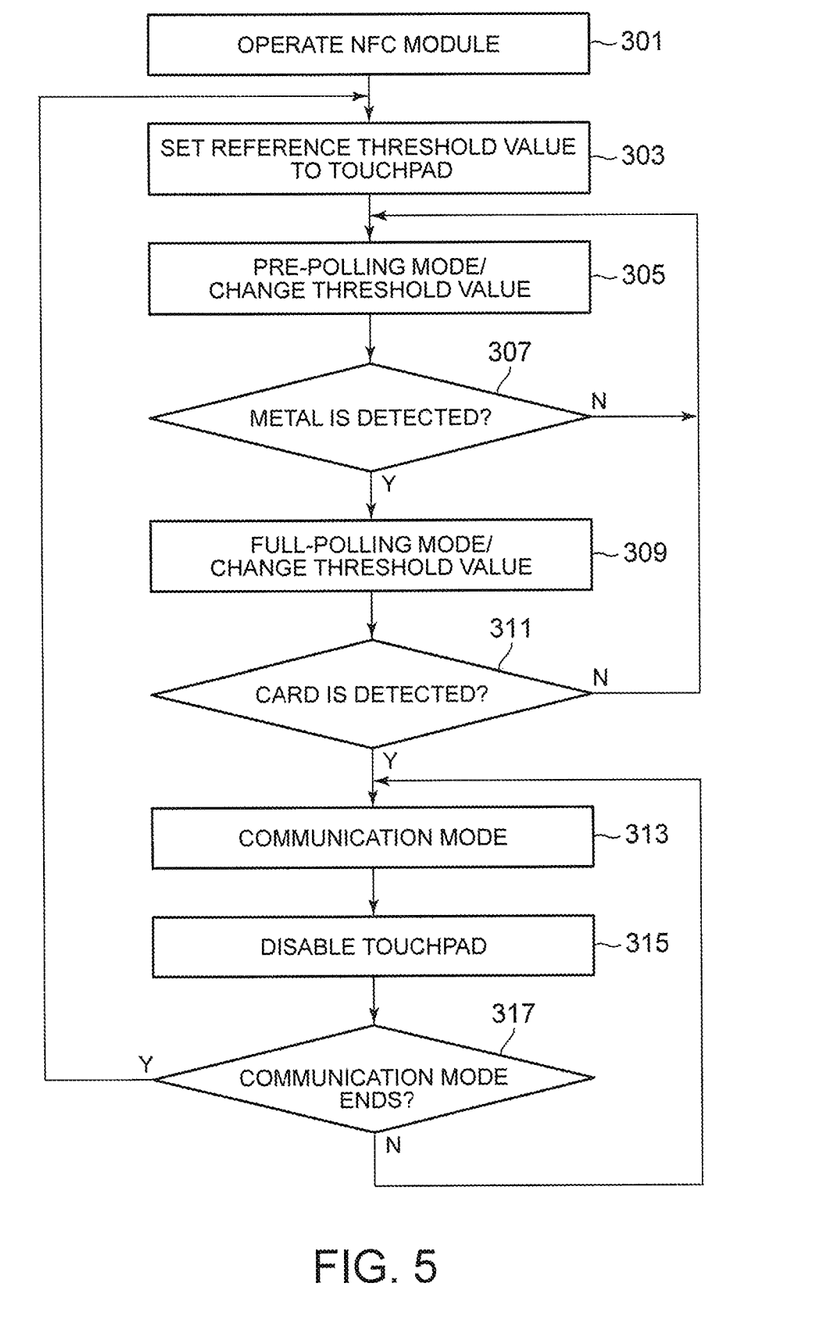
FIG. 5 is a flow chart of a method for operating the malfunction prevention system from FIG. 4.
Figure 6:
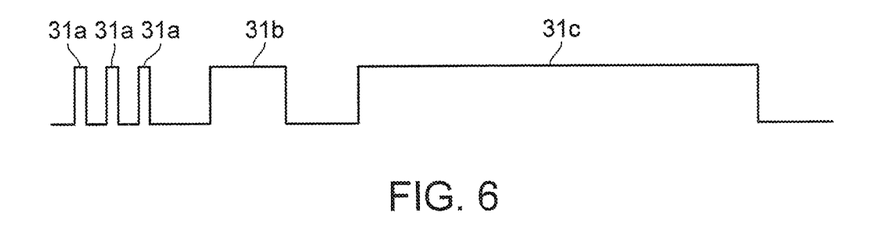
FIG. 6 shows a state where an NFC module emits alternating magnetic fluxes.

FIG. 5 is a flow chart illustrating an operation of the malfunction prevention system 200. FIG. 6 is a view for explaining a state where the NFC coil 21 emits the alternating magnetic fluxes 31. In Block 301, the NFC module 203 and the touch controller 205 operate. In Block 303, the touch controller 205 sets the threshold value to the detected physical quantity as the reference threshold value at which a finger is detected without considering the influence of the NFC. In Block 305, the NFC module 203 operates as a polling device and waits the approach of the NFC card 53 operating as a listening device.

The NFC card 53 does not transmit a signal to the NFC module 203 as an initiator when the NFC card 53 approaches the touchpad 19, and therefore the NFC module 203 needs to detect the approach of the NFC card 53 at arbitrary timing. The NFC module 203 may be configured so as to always emit the alternating magnetic fluxes 31 for use in communication and wait the response from the NFC card 53. However, in order to reduce the power consumption of the laptop 10 until the NFC card 53 approaches, alternating magnetic fluxes for searching are emitted from the NFC coil 21.

Alternating magnetic fluxes 31a (FIG. 6) for searching are equivalent to carrier waves or magnetic fluxes of the other frequencies emitted from the NFC coil 21 at a short time interval only for a short period of time. Since the NFC module 203 may operate the RF portion 203b only when emitting magnetic fluxes, the standby power can be reduced. The NFC module 203 outputs a transmission signal through the hardware line 207 at the timing of starting the emission of the alternating magnetic fluxes 31a and stops the transmission signal at the timing of stopping the emission.

A hand holding the NFC card 53 sometimes approaches the touchpad 19 in order to perform the NFC or a hand holding a metal pen sometimes approaches the touchpad 19 in order to operate the touchpad 19. When the alternating magnetic fluxes 31a are interlinked to the NFC coil 51 or the metal pen, an eddy current flows into the metal, and then the eddy current emits alternating magnetic fluxes. The NFC module 203 detects the fact that a metal approaches the vicinity of the NFC coil 21 from the frequency, the amplitude, the phase, and the like of a voltage of the NFC coil 21 interlinked to the alternating magnetic fluxes emitted from the eddy current, while emitting the alternating magnetic fluxes 31a. Such an operation of the NFC module 203 is referred to as a pre-polling mode.

During the pre-polling mode, the touch controller 205 increases the detection threshold value at the timing of receiving a transmission signal and returns the detection threshold value to a reference threshold value at the timing when the transmission signal is stopped. Therefore, even when a noise enters a sense detection circuit 213 due to the alternating magnetic fluxes 31a emitted from the NFC coil 21, the probability of recognizing the noise as a finger decreases in the touch controller 205 and the touch controller 205 can detect a finger actually contacting the same. Moreover, the alternating magnetic fluxes 31a do not need to be weakened, and therefore, with respect to the NFC module 203, the mounting position of the NFC coil 21 can be secured directly under the touchpad 19 while not affecting the NFC.

The pre-polling is performed even in the time zone when the NFC card 53 does not approach. A user needs to use the touchpad 19 during the pre-polling mode. When the operation of the touch controller 205 is stopped while the NFC module 203 is emitting the alternating magnetic fluxes 31a, the touchpad 19 cannot be used. However, in this embodiment, the threshold value is merely increased, and therefore both the prevention of a malfunction and the detection of a finger by a noise can be achieved.

The NFC module 203 cannot distinguish between the NFC coil 51 and the metal pen in the pre-polling but can presume the approach of the NFC coil 51. In Block 309, the NFC module 203 detecting a metal in Block 307 emits alternating magnetic fluxes 31b for a longer period of time than that of the alternating magnetic fluxes 31a from the NFC coil 21 to recognize the NFC coil 51. At this time, the NFC card 53 does not need to operate with the electric power received from the NFC coil 51. The NFC module 203 judges the approach of the NFC card 53 from the magnetic fluxes emitted from a current flowing through the NFC coil 51. Such an operation of the NFC module 203 is referred to as full-polling mode.

During the full-polling mode, the touch controller 205 increases the detection threshold value at the timing of receiving a transmission signal and returns the detection threshold value to the reference threshold value at the timing when the transmission signal is stopped. In Block 311, when the NFC module 203 presumes the approach of the NFC card 53, the process shifts to Block 313. Unless the NFC module 203 can presume the approach of the NFC card 53 in predetermined period of time, the process returns to Block 305.

In Block 313, the NFC module 203 operates as an initiator to emit alternating magnetic fluxes 31c and the NFC card 53 receives electric power from the alternating magnetic fluxes 31c to operate as a target. The NFC card 53 acquires electric power from a voltage induced in the NFC coil 51 to operate an IC chip 55. The NFC module 203 modulates carrier waves to transmit request data and the NFC card 53 load-modulate subcarrier waves to return response data from the NFC coil 51. The NFC module 203 acquires the response data from changes in the amplitude and the phase of the voltage of the NFC coil 21. Such an operation of the NFC module 203 is referred to as a communication mode.

In the communication mode, the NFC card 53 approaches or contacts the surface of the touchpad 19. Moreover, a finger holding the NFC card 53 approaches or contacts the touchpad 19. Also in the communication mode, there is a possibility that unintended finger coordinates are detected only by increasing the threshold value as with the pre-polling mode or the full-polling mode. In the communication mode, it is not necessary to assume that a user uses the touchpad 19.

When the NFC module 203 enters the communication mode, a disable signal is output through the hardware line 209. The touch controller 205 receiving the disable signal stops the coordinate detection operation to the touchpad 19. The touch controller 205 may be configured so as not to output detected coordinates to the host system 201. In Block 317, when the communication mode ends, the NFC module 203 stops the disable signal, and then the process returns to Block 303.

As the configuration and the operation procedure of the malfunction prevention system 200, one embodiment of the present invention is described and the scope of the present invention is as described in Claims. For example, the full-polling mode may be omitted. Moreover, the order from Block 301 to Block 305 varies depending on systems, and therefore is not particularly limited. Although a disable signal is transmitted through the hardware line 209 in the communication mode, a configuration may be acceptable in which the NFC module 203 transmits a disable signal to the host system 201, and the host system 201 cancels received coordinates also in the communication mode. Moreover, although the description is given taking the electromagnetic coupling wireless communication as an example, the present invention is also applicable to wireless communication using electromagnetic waves.

III. Applications to a Touch Screen

Figure 7:
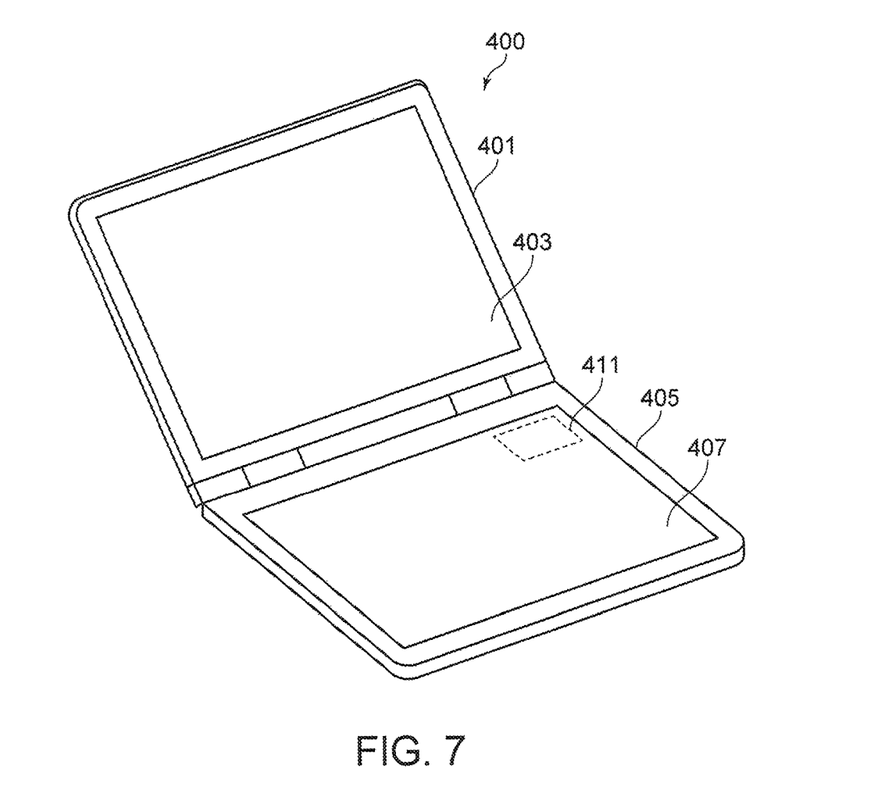
FIG. 7 is a perspective view of a dual screen type electronic device according to an alternative embodiment.

The present invention is also applicable not only to malfunction prevention of a touchpad but malfunction prevention of a touch screen. FIG. 7 is a perspective view of a dual screen type electronic device 400 according to another embodiment. In the electronic device 400, a top chassis 401 and a bottom chassis 405 are bonded by a hinge mechanism. The top chassis 401 contains a touch screen 403 and the bottom chassis 405 contains a touch screen 407.

The electronic device 400 can be used in a set of use modes by changing the relative attitude of the top chassis 401 and the bottom chassis 405 and the attitude to the desk upper surface, as necessary, by the hinge mechanism. In an example of the use mode, a software keyboard is displayed on the touch screen 407, whereby the electronic device 400 can be used as a laptop. Under the corner of the touch screen 407, an NFC coil 411 for communicating with the NFC card 53 is disposed.

The touch screen 407 contains a touch panel or a touch panel function and a liquid crystal panel. As a method for incorporating the touch panel in the touch screen 407, an external type and a built-in type are mentioned. In the external type, the touch panel is disposed on the upper surface of the liquid crystal panel. As the built-in type, an on-cell type and an in-cell type are mentioned. In the on-cell type, an indium tin oxide (ITO) electrode pattern is formed between a color filter substrate and a polarizing plate of the liquid crystal panel to incorporate a touch panel function therein. In the in-cell type, a touch panel function formed with an ITO is incorporated in pixels of a TFT array substrate of the liquid crystal panel.

The NFC coil 411 can be disposed on these kinds of touch screen 407 by various methods. In order to emit magnetic fluxes required for the NFC to space, it is desirable to dispose the NFC coil 411 near the surface of the touch screen 407. In the external type touch screen 407, the NFC coil 411 formed with an ITO film can be disposed between the touch panel and a liquid crystal module.

In the built-in type touch screen 407, the NFC coil 411 can be formed with an ITO on a color filter substrate or in a TFT array substrate. In such a touch screen 407, a malfunction sometimes arises in the touch screen 407 due to alternating magnetic fluxes emitted by the NFC coil 411 but the malfunction can be overcome by the application of the method described with reference to FIG. 4 and FIG. 5.

As has been described, the present invention provides an improved method and apparatus for preventing malfunctions of a touch panel disposed near an antenna.

While the invention has been particularly shown and described with reference to a preferred embodiment, it will be understood by those skilled in the art that various changes in form and detail may be made therein without departing from the spirit and scope to of the invention.

What is claimed is:
1. An electronic device comprising:
a touch panel;
a coil
emits alternating magnetic fluxes of a first time interval during a pre-polling mode to detect an approaching of a near field communication (NFC) card, and
emits alternating magnetic fluxes of a second time interval during a full-polling mode after a metal has been detected;
a wireless module emits alternating magnetic fluxes of a third time interval after said NFC card has been detected; and
a touch controller detects an operation to said touch panel with a predetermined detection sensitivity, and reduces said detection sensitivity when said coil is emitting said alternating magnetic fluxes.

2. The electronic device of claim 1, wherein said wireless module conforms to said NFC standard.

3. The electronic device of claim 1, wherein said touch controller receives a transmission signal showing that said coil is emitting said alternating magnetic fluxes through a hardware transmission path from said wireless module.

4. The electronic device of claim 1, wherein said touch controller reduces said detection sensitivity when said wireless module is emitting said alternating magnetic fluxes.

5. The electronic device of claim 4, wherein said touch controller disables an input from said touch panel while said wireless module is emitting said alternating magnetic fluxes.

6. The electronic device of claim 1, wherein said touch panel is a touchpad operating a mouse cursor.

7. The electronic device of claim 6, wherein said coil is disposed on a back surface of said touchpad in order to be adjacent to said touchpad.

8. The electronic device of claim 7, wherein a projection of an outline of said touchpad is overlapped with an outline of said coil.

9. The electronic device of claim 7, wherein said coil is formed with a pattern on a circuit board of said touchpad disposed on said back surface of said touchpad.

10. The electronic device of claim 1, wherein said coil is incorporated in a touch screen containing a display.

11. The electronic device of claim 1, wherein said second time interval is longer than said first time interval.

12. The electronic device of claim 11, wherein said third time interval is longer than said second time interval.

13. A method comprising:
detecting by a touchpad of an electronic device having a wireless module a physical quantity that changes due to the approach of a finger with a predetermined detection sensitivity;
in response to an emission of an alternating magnetic flux by said wireless module, reducing said detection sensitivity;
in response to said emission of said alternating magnetic flux has stopped, returning said detection sensitivity to said predetermined detection sensitivity;
emitting a first alternating magnetic flux for detecting a partner device approaching said touchpad;
reducing said detection sensitivity in response to said emission of said first alternating magnetic flux;
emitting a second alternating magnetic flux for communicating with said partner device; and
stopping a detection function of said touchpad while said second alternating magnetic flux is being emitted.

* * * * *